United States Patent
Syrjänen et al.

(10) Patent No.: US 8,243,631 B2
(45) Date of Patent: Aug. 14, 2012

(54) DETECTING DEVICES IN OVERLAPPING AUDIO SPACE

(75) Inventors: Sampo Syrjänen, Espoo (FI); Panu Vartiainen, Vääksy (FI)

(73) Assignee: Nokia Corporation, Espoo (FI)

( * ) Notice: Subject to any disclaimer, the term of this patent is extended or adjusted under 35 U.S.C. 154(b) by 1415 days.

(21) Appl. No.: 11/616,474

(22) Filed: Dec. 27, 2006

(65) Prior Publication Data

US 2008/0159178 A1    Jul. 3, 2008

(51) Int. Cl.
*H04L 12/16* (2006.01)
*H04Q 11/00* (2006.01)

(52) U.S. Cl. ........ 370/261; 370/260; 370/310; 370/352; 348/14.08; 348/14.09; 348/14.1; 379/202.01; 379/203.01; 379/204.01; 379/205.01; 379/206.01; 455/416

(58) Field of Classification Search .................. None
See application file for complete search history.

(56) References Cited

U.S. PATENT DOCUMENTS

| | | | |
|---|---|---|---|
| 5,991,385 A | 11/1999 | Dunn et al. | |
| 6,163,692 A | 12/2000 | Chakrabarti et al. | |
| 7,043,254 B2 | 5/2006 | Chawla et al. | |
| 7,292,845 B2 * | 11/2007 | Flannery | 455/416 |
| 7,852,998 B1 * | 12/2010 | Smith et al. | 379/202.01 |
| 2002/0107008 A1 | 8/2002 | Hendrey et al. | |
| 2002/0142788 A1 | 10/2002 | Chawla et al. | |
| 2003/0083059 A1 * | 5/2003 | Spitzer et al. | 455/423 |
| 2004/0116130 A1 | 6/2004 | Seligmann | |
| 2004/0213419 A1 | 10/2004 | Varma et al. | |
| 2005/0094578 A1 | 5/2005 | Pasha et al. | |
| 2005/0113107 A1 | 5/2005 | Meunier | |
| 2005/0180582 A1 * | 8/2005 | Guedalia | 381/92 |
| 2005/0212908 A1 | 9/2005 | Rodman et al. | |
| 2005/0239487 A1 | 10/2005 | Glass et al. | |
| 2006/0132595 A1 | 6/2006 | Kenoyer et al. | |
| 2007/0016426 A1 | 1/2007 | Hershey et al. | |
| 2007/0050451 A1 * | 3/2007 | Caspi et al. | 709/204 |
| 2007/0097886 A1 * | 5/2007 | Schwagmann et al. | 370/260 |
| 2007/0202890 A1 | 8/2007 | Feher | |
| 2007/0288998 A1 | 12/2007 | Gudigara et al. | |
| 2007/0291918 A1 * | 12/2007 | Diethorn | 379/202.01 |
| 2010/0020954 A1 | 1/2010 | Gilg et al. | |

FOREIGN PATENT DOCUMENTS

EP     1868362     12/2007

OTHER PUBLICATIONS

Nishiguchi, S., Higashi, K., Kameda, Y. and Minoh, M., "A Sensor-Fusion Method for Detecting a Speaking Student", 2003 International Conference on Multimedia and Expo, Publication Date Jul. 6-9, 2003, vol. 1, pp. I-129-32.

(Continued)

*Primary Examiner* — Jae Y Lee
(74) *Attorney, Agent, or Firm* — Banner & Witcoff, Ltd.

(57) ABSTRACT

Devices are able to identify other devices in a shared audio space (e.g., a room) by emitting a signal and receiving messages from other devices over a data connection indicating which of the other devices received the emitted signal. Devices that are determined to be in the same audio space can selectively mix audio in a teleconference to inhibit mixing of audio signals for devices that are determined to be in the same audio space.

33 Claims, 4 Drawing Sheets

OTHER PUBLICATIONS

Mandal, Atri, Lopes, Cristina V., Givargis, Tony, Haghighat, Amir, Jurdak Raja and Baldi, Pierre, "Beep: 3D Indoor Positioning Using Audible Sound", IEEE Consumer Communicatiosn and Networking Conference, Jan. 2005, pp. 348-353.

International Search Report and Written Opinion for International Application No. PCT/IB2007/003845 mailed Jun. 20, 2008, 13 pages.

International Preliminary Report on Patentability for International Application No. PCT/IB2007/004013, mailed Jul. 9, 2009, 8 pages.

Schulzrinne et al, "Application-Layer Mobility Using SIP", Mobile Computing and Communications Review, ACM, New York, NY, US, vol. 4, No. 3, Jul. 1, 2000, pp. 47-57, XP000992003, ISSN 1091-1669, section III.B.2 mid-call mobility; figure 33.

Figueiras et al, "Accuracy and Timing aspects of Location Information based on Signal-Strength Measurements in Bluetooth", IEEE International Symposium on Personal, Indoor and Mobile Radio Communications, (PIMRC), vol. 4, Sep. 11-14, 2005, pp. 2685-2690, XP010928179, ISBN: 978-978-38007-2-4, section I.

International Search Report and Written Opinion for International Application PCT/IB2007/004013, mailed Jul. 10, 2008, 15 pages.

Office Action for U.S. Appl. No. 11/616,508 mailed Sep. 15, 2010.

Non-Final Office Action for U.S. Appl. No. 11/616,492 mailed Oct. 7, 2011.

* cited by examiner

DETECTING DEVICES IN OVERLAPPING AUDIO SPACE

FIELD OF ART

The invention relates generally to a method and system for detecting devices that are in the same or overlapping audio space.

BACKGROUND

Many people communicate over devices that exchange audio information over a shared connection. One common example of a shared connection is a teleconference wherein participants join the group from many locations, including multiple rooms within a building and remote locations. In a typical teleconference, the participants located within the same room at the same location use a device that includes a microphone and speaker combination (e.g., a speakerphone). Sometimes, participants in the same room may have difficulty hearing remote participants properly and being able to be heard by participants in remote areas. Sometimes participants use individual microphones and speaker combinations (for example, mobile telephones) to avoid problems associated with sharing a single microphone and speaker combination. However, the presence of multiple speakers creates an environment that may lead to other difficulties.

When participants in a teleconference speak, the microphone output signal from each participant is generally mixed together and sent to all other participants. When more than one participant is located within the same room using non-shared devices (e.g., mobile telephones), each participant hears not only the other speakers present in the room, but also hears a mixed version of those speakers' voices over the teleconference, thus creating confusion. It would be advantageous to avoid this sort of situation. It would also be advantageous to allow the relative location of devices participating in a teleconference to be determined (for example, determining which devices are located within an overlapping audio space).

SUMMARY

This summary is provided to introduce a selection of concepts in a simplified form that is further described below in the detailed description. The summary is not intended to identify key features or essential features of the claimed subject matter, nor is it intended to be used to limit the scope of the claimed subject matter.

According to various aspects, devices may form a data connection. One device transmits a recording message to the other devices over the shared data connection. The recording message indicates to the other devices that they should begin recording sounds picked up by their microphones. A locating signal, which may be an audio signal, is emitted by one device to other devices within an audio space (such as a room) in which one of the participants is located. The locating signal is received by other devices that are located within the same audio space. Those devices that detect the emitted locating signal send a response message to emitting device indicating that the locating signal was detected, thus establishing that they are in the same audio space (e.g., a room) as the emitting device. The process is repeated for other devices until each device is able to determine what other devices are located in the same audio space.

According to another aspect, an audio teleconference is established after determining which devices are located in the same room. Audio originating from devices that are determined to be in the same room or acoustic space might not be mixed into downstream audio signals designated for those devices. This allows participants in the same room to hear each other's voices live without also receiving and hearing a feedback version of the voices in a downstream audio signal from a teleconference server. Furthermore, by performing such audio filtering and mixing, an audio echoing effect may be reduced since audio originating from a location may be filtered out from audio streams sent to that same location.

According to another variation of the invention, audio for participants in a conference call is selectively mixed to inhibit supplying audio from participants who are determined to be in the same room. The selective mixing may be achieved by a process in which devices are determined to be in the same audio space by emitting signals from the devices and then determining which devices were able to detect the emitted signals.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

Figure 1:
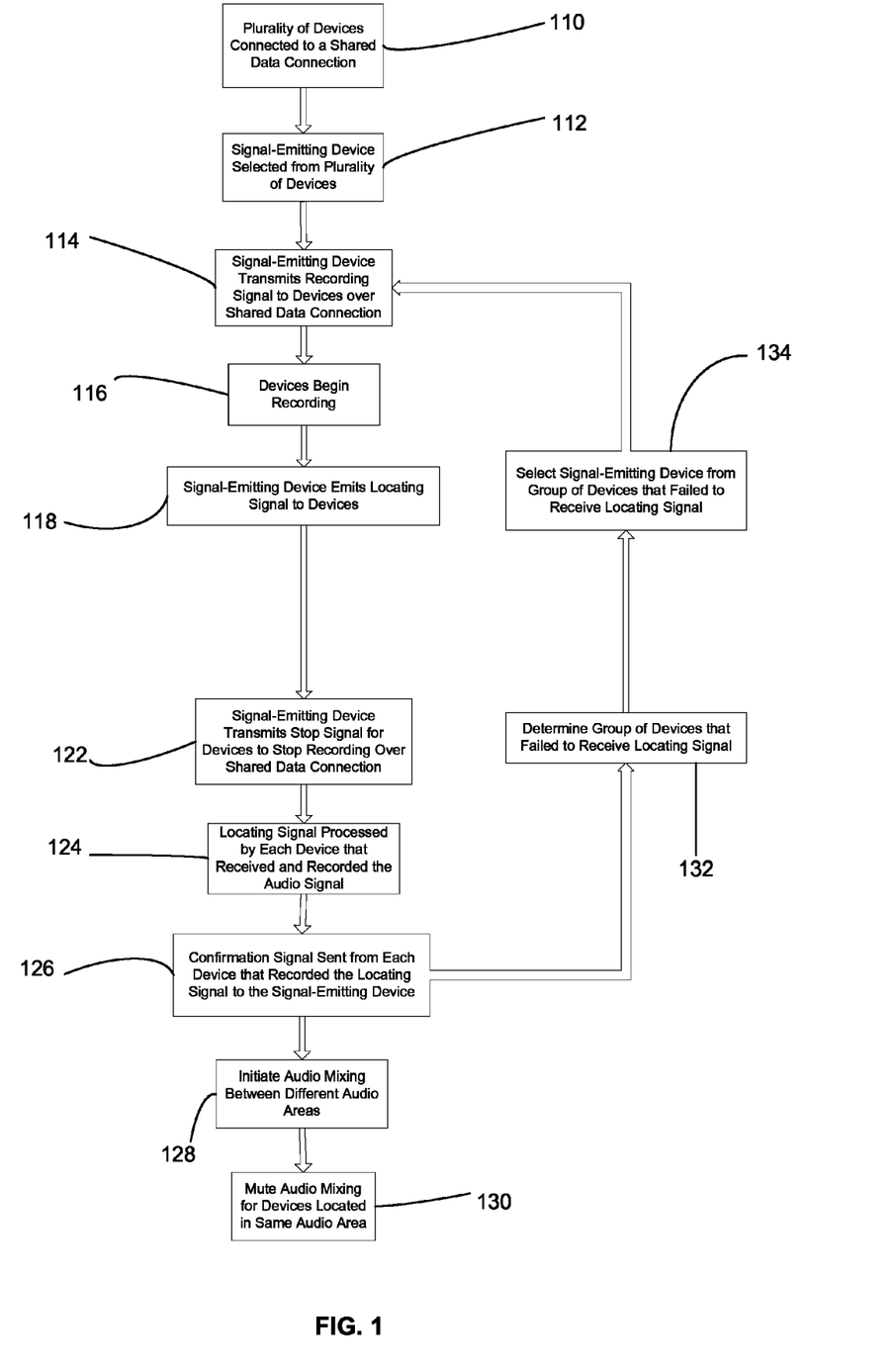
FIG. 1 is a flowchart illustrating a method of identifying devices that are located within the same audio space and mixing the audio output signals for each device based upon the device's location according to one or more aspects described herein.

FIG. 1 illustrates a method including steps for determining which devices are located in an overlapping audio space according to certain aspects of the invention. In step 110, multiple devices are connected to a shared data connection, such as over a local area network (LAN), the Internet, etc. The devices may additionally or alternatively establish a data session using a virtual broadcast network between devices that may be applied on top of underlying networks so that each device may receive the broadcast messages. Alternatively, a shared data channel may be established via an internet chat service reserved for data communication (e.g., Internet relay chat (IRC) channel). Various types of networks that may be used include IP networks, local BLUETOOTH multipoint connections, cellular networks and the like. Other communication protocols could be used, such as Session Initiation Protocol (SIP).

In one or more configurations, one or more devices may be connected to a telecommunications server that coordinates room detection. For example, the telecommunications server may determine whether two or more terminals or devices participating in a teleconference are located at the same location or within the same acoustic space. The telecommunications server may pause or stop audio mixing between participants while the server performs a location detection process. For example, the server may emit a tone through one of the participant terminals or devices and subsequently "listen" to the other participating terminal's microphones to detect if the emitted tone is audible through those other devices. Based on the tone detection information, the server may cluster devices into one or more locations. For example, if the emitted tone is audible through one or more other devices, the emitting device and the one or more other devices may be designated as being in the same location or acoustic space. This process may be repeated until each of the participating devices has been evaluated.

Each device may comprise a device, such as a mobile terminal, including a microphone and a speaker. The speaker may emit a signal, such as a dual tone multiple frequency (DTMF) signal, in addition to audio signals emitted during a teleconference. Standard and non-standard DTMF (e.g., tone combinations not included in standard DTMF codes) signals may be used. Furthermore, each device may also comprise a recording function able to record or capture audio that is received through the microphone.

In step 112, one of the devices is selected to start the process. Such a selection can be made randomly or based on some other criteria, such as based on a unique serial number of the device (e.g., each device transmits its unique serial number to the others during the data connection step, and the device having the lowest serial number becomes the selected device). Additionally, the selection may be made by a teleconference server facilitating the teleconference and to which each of the participating devices or terminals are connected. Alternatively, in an ad-hoc network established by the participating devices, an emitting device may be selected by a master device or the devices as a whole. In step 114, the selected device transmits a recording signal to the other devices over the shared data connection. The recording signal may comprise a message indicating that each device should begin recording through its microphone, and identifying the selected device that sent the message (e.g., by serial number, telephone number, or some other identifier). In step 116, in response to receiving the recording signal, each device begins recording either for a predetermined period of time (e.g., one second) or until instructed to stop recording.

In step 118, the one selected signal-emitting device emits through its speaker a locating signal, which may comprise an audible DTMF tone (further details of this step are described below). Other devices located in the same audio space (e.g., the same room) are able to pick up and record this signal through their microphones, but other devices not in the same audio space (e.g., in another room or in another building) would not. In step 122, the signal-emitting device transmits a stop signal to the other devices, instructing them to stop recording. In an alternative embodiment, the other devices record for a predetermined period of time, such as one second, and no such stop signal is required.

In step 124, each device processes its recorded signal to determine whether it detected the emitted locating signal. Each device that detects the locating signal transmits a response to the emitting device indicating that the signal was detected, thus allowing each pair of devices to determine whether they are in the same audio space, such as the same room. In one variation, all devices transmit a response that either indicates that the locating signal was detected or indicates that it was not detected. Devices that are in the same audio space would, after step 126, know what other devices were in that same audio space based on detecting the emitted locating signal.

In step 132, a group of devices that failed to receive or detect the locating signal may be identified. In step 134, a next device may be selected from the group of devices that failed to detect the locating signal (e.g., by selecting the next-highest serial number, phone number, or other identifier). Upon selecting the next device, the process may repeat in step 114 until all devices have been either selected or determined to be in a same audio space as another device.

In step 128, audio mixing may be activated between different audio areas. That is, audio signals received from one audio space or location may be mixed into a downstream signal designated for terminals in a second audio space or location. However, according to one or more aspects, in step 130, audio mixing is locally inhibited or muted for devices that are determined to be in the same room or at the same location. In other words, audio originating from a first device in a location might not be mixed into an audio stream designated for a second device in the same location.

Figure 2:
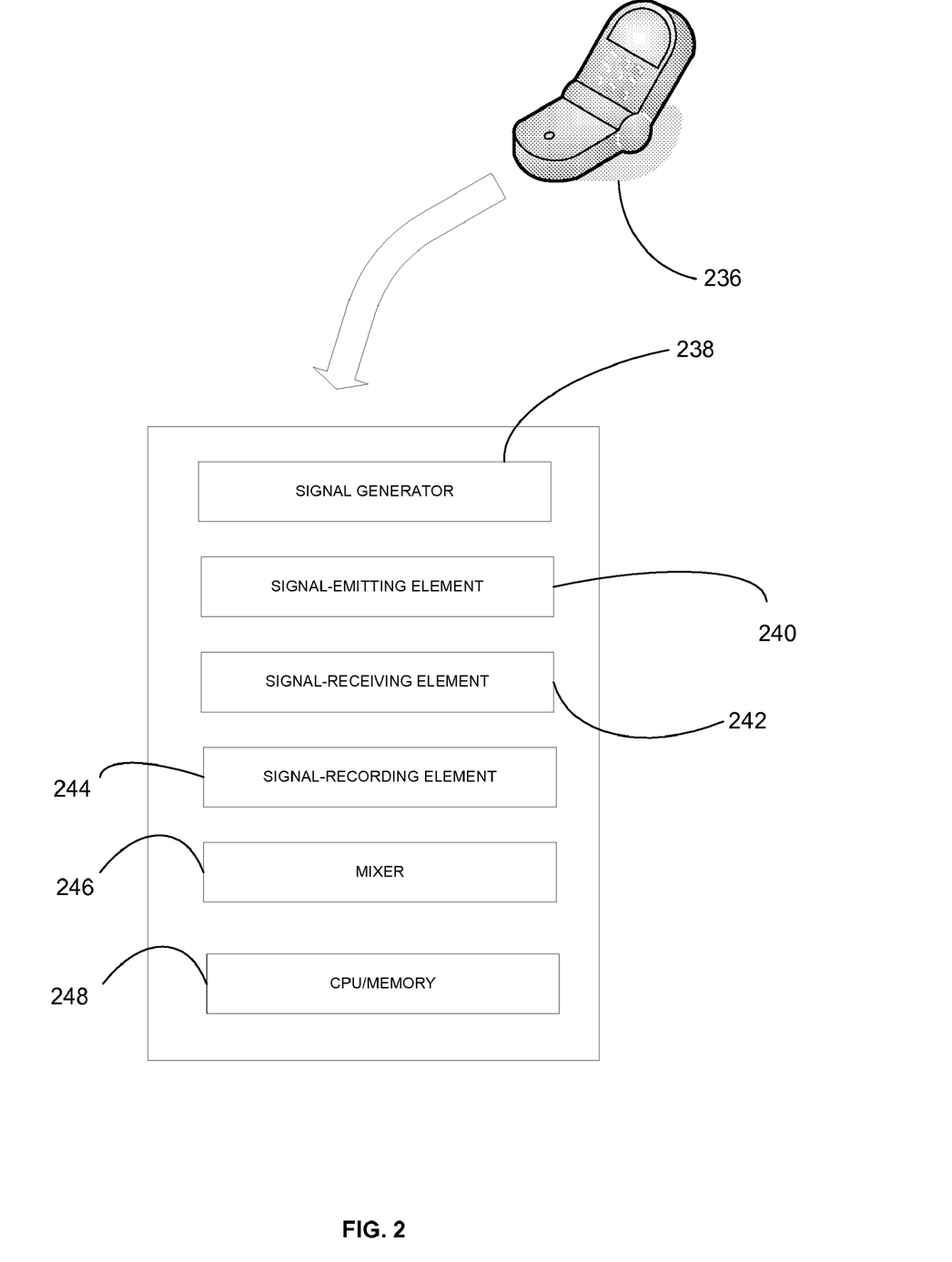
FIG. 2 is a device according to one or more aspects described herein.

FIG. 2 shows one possible device configuration. The device may comprise a telephone or mobile device 236. According to one variation, the device includes signal generator 238, which may comprise a DTMF tone generator as is known in the art. The device may also include signal-emitting element 240, such as a speaker, and signal-receiving element 242, such as a microphone. Signal recording element 244 may comprise a memory that stores a digital version of received signals. Mixer 246 may also be included to mix audio from other conference participants. Mixer 246 included in mobile device 236 may be implemented on a digital signal processing (DSP) chip having one or more DSP software application. Alternatively, mixer 246 may be on a circuit switched telecommunications server or a voice over Internet Protocol (VoIP)-based telecommunications server on an Internet Protocol (IP) network. A CPU/memory 248 may comprise computer-executable instructions that, when executed, carry out instructions to perform steps such as those illustrated in FIG. 1. One skilled in the art will recognize that mixer 246 may be implemented as an internal or external component or a combination of both to provide appropriate audio mixing for outputting to each teleconference participant. Additionally, mixer 246 may mix a separate audio output stream for each participant or may, alternatively, produce a single output signal to each participant that is located within the same location.

Figure 3:
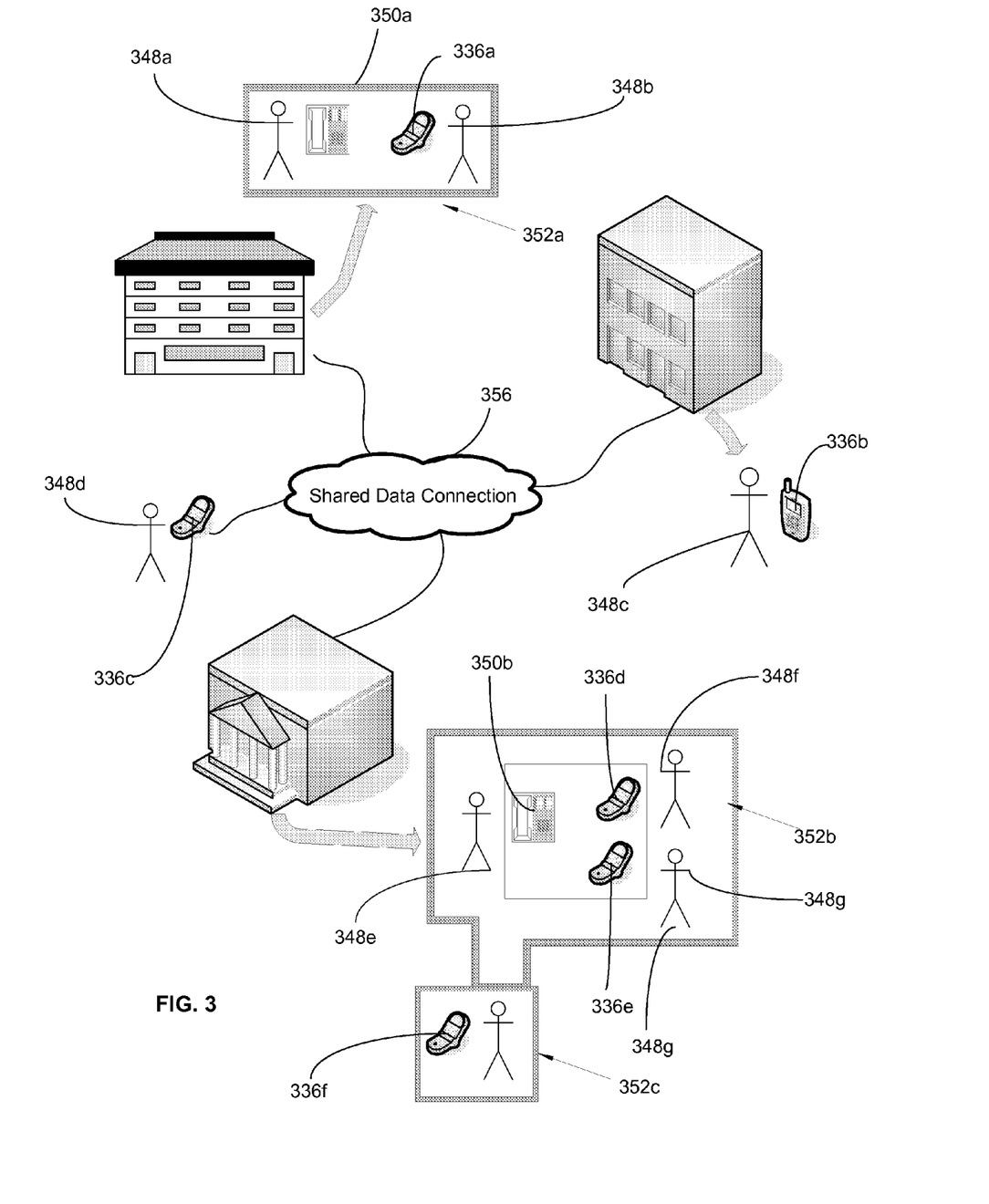
FIG. 3 illustrates a shared data connection hosting multiple participants according to one or more aspects described herein.

FIG. 3 illustrates a shared data connection 356 and multiple devices at several locations that communicate with each other over the shared data connection. The shared data connection may established over a network such as the Internet, a LAN, a wireless LAN and/or other wired or wireless networks. Each of the devices may be located within an audio space that may or may not include other devices. Several audio spaces 352 are shown in FIG. 3, with each audio space having participants 348 within a teleconference.

In the embodiment shown in FIG. 3, the shared data connection 356 includes devices that are located in three buildings, several rooms within one of the buildings, and two remote users. Each of devices 336 may comprise a device of the type illustrated in FIG. 2. The speaker and microphone combination may be implemented in a speakerphone arrangement such as speaker telephones 350 that are traditionally used in a teleconference, or in a mobile device. A wireless or "hands-free" headset or other communication device or system may further be used by participants 348 in conjunction with a communication device, e.g., device 336b, during a teleconference. Devices 336 and/or 350 may further include one or more signal-receiving elements that may process detected audio signals (e.g., speech) to determine one or more signal characteristics.

Figure 4:
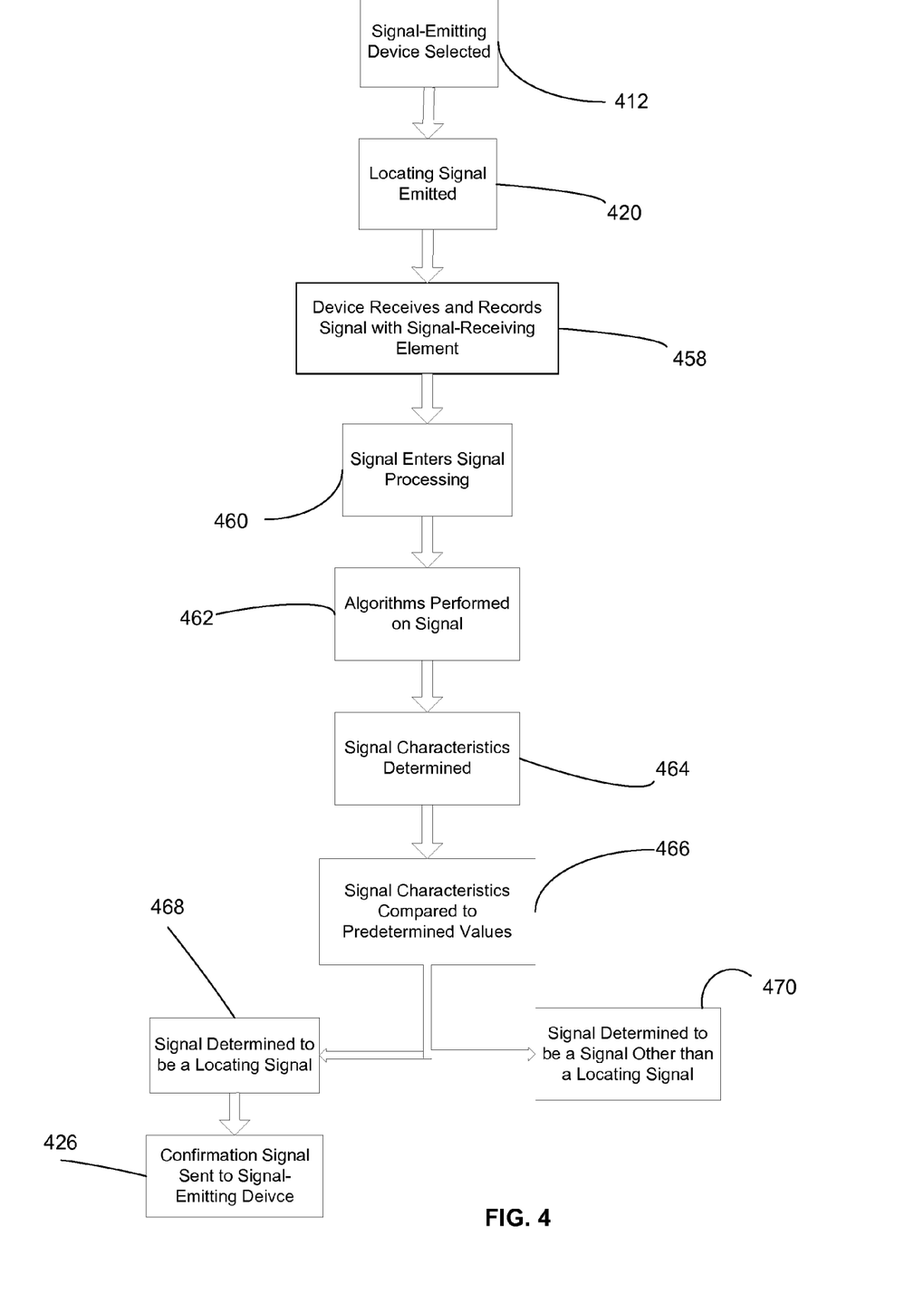
FIG. 4 is a flowchart illustrating the method in which a signal may be processed according to one or more aspects described herein.

FIG. 4 illustrates steps according to one embodiment of the invention to detect each device located within an audio space and to communicate with other devices located within the same audio space. In step 412, a signal-emitting device is selected from the plurality of devices. The signal-emitting device may be chosen by an automatic or a manual method.

In step 420, the signal-emitting device emits an audio locating signal that may be loud enough to be heard by devices that are located within the same audio space as the emitting device. The locating signal may be received by devices with signal receiving elements (step 458), and processed (step 460) through a series of algorithms (step 462). The locating signal can be identified by a plurality of characteristics (step 464) that are used to determine whether the locating signal matches a set of predetermined characteristics 466 that define the desired locating signal. When an incoming signal matches the predetermined characteristics (step 464) of the locating signal, it is identified as a locating signal (step 468) and is processed further. A confirmation signal may be transmitted in response to the identification of a locating signal (step 426). The confirmation signal informs the signal-emitting device that a locating signal was received by a device within the same audio space.

In one embodiment, the locating signal is a multi-frequency audio signal such as a dual tone multiple frequency (DTMF) tone. The signal may be in the form of a sine wave having two frequencies, a low frequency and a high frequency. The signal is identified by the combination of its low frequency and its high frequency when digital signal processing 464 occurs. The combination of the low frequency and the high frequency of a signal determine at least a portion of the set of characteristics that is associated with the signal. As discussed above, the set of characteristics of a signal 464 is compared to a predetermined set of characteristics 466 of a locating signal. Additional characteristics of the signal may be determined, such as the length of time of the signal, that further assists in defining the set of characteristics 464 that is associated with a signal. As one example, a 250 millisecond tone with frequencies of 1730 Hz and 1030 Hz may be used.

One skilled in the art will recognize that a signal may contain any desired number of characteristics upon which to base the identity of the signal. One skilled in the art will also appreciate that any type of signal may be used that is capable of communicating with other devices, including but not limited to ultrasound signals, infrared signals, and the like. In instances where infrared signal is used, a local space or area may be referred to as a visual space rather than an audio space. Generally, a visual space of an infrared signal is functionally similar to an audio space.

Mobile telephones typically contain traditional keypads and are likely to use frequencies that are within the DTMF spectrum to identify when a particular key on the keypad is selected. Therefore, benefits arise when a locating signal is selected that has a frequency outside of the spectrum of frequencies of the DTMF spectrum. Although one skilled in the art will recognize that it is possible for a locating signal to be recognized even if it falls within the spectrum of frequencies of the DTMF spectrum, it may be beneficial, although not required, for the frequencies of the locating signal to be distinct from the frequencies of the normal DTMF spectrum. In this embodiment, the locating signal is unlikely to be confused with the common dual tone signals within the DTMF spectrum.

In certain embodiments of the invention, Goertzel's algorithm may be used to analyze the locating signal and detect particular frequencies within a dual tone. The Goertzel algorithm is a digital signal processing technique that is used to identify frequency components in a digital signal by considering a set of predetermined points along a digital signal's sinusoidal wave. The digital signal processing step may be performed by a variety of algorithms other than the Goertzel algorithm, including an FFT algorithm. Although the FFT algorithm may not be as efficient under some circumstances as the Goertzel algorithm, it may be used to identify the correct locating signal in accordance with an aspect of the invention. Furthermore, any algorithm that is capable of identifying the correct locating signal may be used. One skilled in the art will appreciate that the processing step in the present invention is not limited to the use of the Goertzel algorithm or the FFT algorithm.

In one embodiment of the invention, the Goertzel algorithm is used to consider two specific aspects of the signal—the frequency and the length of time of the signal. A threshold value is predetermined for both the frequency and the length of time of the signal. A signal that is received by a device is processed to determine a value for the frequency and the length of time of the signal. If the value of the frequencies and the length of time of the signal meets or exceeds the predetermined threshold values 466, the signal is verified as a locating signal.

Additionally, the methods and features recited herein may further be implemented through any number of computer readable mediums that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

While illustrative systems and methods as described herein embody various aspects of the present invention, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method, comprising:
   determining, by a first communication device, that the first communication device has been selected by a communication server to perform a location detection process among a plurality of communication devices;
   emitting, by the first communication device, an audible locating signal;
   receiving, by the first communication device, from a second communication device of the plurality of communication devices a message indicating that the audible locating signal was determined by the second communication device to match a specified audio signal; and
   in response to determining that the second communication device detected the audible locating signal, storing an indication that the first communication device is in a shared audio space with the second communication device, wherein the second communication device is separate from the communication server.

2. The method of claim 1, wherein the audible locating signal comprises an audio signal emitted from a speaker incorporated into the first communication device.

3. The method of claim 2, wherein the audible locating signal comprises a dual tone multi-frequency (DTMF) signal.

4. The method of claim 3, wherein the DTMF signal comprises tones that do not coincide with tones assigned to numeric keys associated with each of the plurality of communication devices.

5. The method of claim 1, further comprising repeating the emitting, receiving, and storing steps with a third communication device of the plurality of communication devices.

6. The method of claim 1, further comprising, prior to emitting the audible locating signal, transmitting, over a shared data connection, a recording message indicating that each of the plurality of communication devices should begin recording.

7. The method of claim 6, further comprising, after transmitting the recording message, receiving one or more confirmation messages confirming initiation of recording.

8. The method of claim 6, further comprising, after emitting the audible locating signal, transmitting a stop message indicating that each of the plurality of communication devices should stop recording.

9. The method of claim 1, further comprising, prior to emitting the audible locating signal, selecting the first communication device to emit the audible locating signal on a basis of information exchanged at a time a shared data connection is established.

10. The method of claim 1, further comprising inhibiting mixing of a teleconference audio signal based on the stored indication.

11. The method of claim 10, wherein the inhibiting inhibits mixing of teleconference audio signals that are determined to originate from the first communication device or the second communication device.

12. The method of claim 1, wherein the emitting, receiving, and storing steps are performed in a mobile terminal.

13. A method comprising:
receiving, by a first communication device, a first message configured to initiate a recording operation at the first communication device, the first message being received from a second communication device, which has been selected by a communication server;
initiating recording of one or more audio signals at the first communication device;
analyzing the one or more recorded audio signals and determining, based on the analysis, whether a predetermined signal is present in each of the one or more recorded audio signals; and
in response to determining that the predetermined signal is present, transmitting a second message to the second communication device indicating that the predetermined signal was present,
wherein the second communication device is separate from the communication server.

14. The method of claim 13, further comprising, after initiating recording of the audio signals, stopping recording upon receiving a stop message indicating that the recording operation should stop.

15. The method of claim 13, further comprising transmitting a confirmation message to a device from which the first message was received confirming that the first message was received.

16. The method of claim 13, wherein analyzing the one or more recorded audio signals comprises detecting whether a predetermined dual tone multi-frequency (DTMF) tone is present.

17. The method of claim 16, wherein analyzing the one or more recorded audio signals further comprises analyzing the one or more recorded audio signals using Goertzel's algorithm.

18. The method of claim 13, further comprising, in response to determining that the predetermined signal is not present, transmitting a third message, which indicates that the predetermined signal was not detected.

19. The method of claim 13, further comprising inhibiting mixing of an audio signal from another device determined to be within the same audio space.

20. The method of claim 13, wherein the receiving, analyzing, and transmitting are performed in a mobile terminal.

21. A device comprising:
a signal-emitting element configured to generate a locating signal;
a signal-receiving element configured to receive signals emitted from at least one other device;
a processor; and
memory storing computer readable instructions that, when executed by the processor, cause the device to perform:
determining whether the device is selected by a communication server to perform a location detection process;
emitting the locating signal by the signal-emitting element if the device is selected;
receiving from the at least one other devices a message indicating that the locating signal was determined by the at least one other device to match a specified audio signal; and
in response to receiving the message indicating that the locating signal was determined, storing an indication that the device is in a shared audio space with the at least one other device,
wherein the at least one other device is separate from the communication server.

22. The device of claim 21, wherein the signal-emitting element comprises a speaker and the locating signal comprises an audio signal.

23. The device of claim 22, wherein the locating signal comprises a dual tone multi-frequency (DTMF) signal.

24. The device of claim 21, wherein the memory stores further instructions for, prior to the locating signal being emitted, establishing a shared data connection with the at least one other device and transmitting a recording message to the at least one other device over the shared data connection indicating that a recording operation should begin.

25. The device of claim 24, wherein the memory stores further instructions for, after the locating signal is emitted, transmitting a stop message to the at least one other device over the shared data connection indicating that the recording operation should stop.

26. The device of claim 21, further comprising a mixer capable of mixing audio signals received from the at least one other device.

27. The device of claim 26, wherein the memory stores further instructions for inhibiting mixing of audio signals received from device that are determined to be in a shared audio space with the device.

28. The device of claim 21, wherein the device comprises a mobile terminal.

29. The device of claim 21, wherein the signal-receiving element is further configured to record signals, analyze the signals to determine whether a predetermined signal is present and, in response to determining that the predetermined signal is present, store an indication that the device is in a shared audio space with the at least one other device.

30. A non-transitory computer-readable medium comprising instructions that, when executed, cause a processor to perform a method comprising:
  receiving, by a first communication device, a first message indicating that a recording operation should begin within the first communication device, the first message being received from a second communication device, which has been selected by a communication server;
  initiating recording audio signals at the first communication device;
  analyzing the recorded audio signals and determining, based on the analysis, whether a predetermined signal is present; and
  in response to determining that the predetermined signal is present, transmitting a second message to the second communication device indicating that the predetermined signal was detected,
  wherein the second communication device is separate from the communication server.

31. A method comprising:
  determining, by a first communication device, that the first communication device has been selected by a communication server to perform a location detection process among a plurality of communication devices;
  emitting, by the first communication device, an audible locating signal;
  receiving, by the first communication device, from a second communication device of the plurality of communication devices a message indicating that the audible locating signal was determined by the second communication device to match a specified audio signal;
  in response to determining that the second communication device detected the audible locating signal, storing an indication that the first communication device is in a shared audio space with the second communication device;
  initiating a teleconference among the plurality of communication devices; and
  inhibiting mixing of audio for devices that are determined to be within the shared audio space,
  wherein the second communication device is separate from the communication server.

32. An apparatus comprising:
  means for determining that the apparatus has been selected by a communication server to perform a location detection process among a plurality of communication devices;
  means for emitting an audible locating signal;
  means for receiving from a second communication device of the plurality of communication devices a message indicating that the audible locating signal was determined by the second communication device to match a specified audio signal; and
  means for storing an indication that the apparatus is in a shared audio space with the second communication device in response to determining that the second communication device detected the audible locating signal,
  wherein the second communication device is separate from the communication server.

33. The apparatus of claim 32, further comprising means for transmitting, over a shared data connection, a recording message indicating that each of the plurality of communication devices should begin recording.

* * * * *